United States Patent
Doukhvalov et al.

(10) Patent No.: US 9,774,568 B2
(45) Date of Patent: Sep. 26, 2017

(54) COMPUTER SECURITY ARCHITECTURE AND RELATED COMPUTING METHOD

(71) Applicant: AO Kaspersky Lab, Moscow (RU)

(72) Inventors: Andrey P. Doukhvalov, Moscow (RU);
Pavel V. Dyakin, Moscow (RU);
Dmitry A. Kulagin, Moscow (RU);
Sergey B. Lungu, Moscow (RU);
Stanislav V. Moiseev, Moscow (RU)

(73) Assignee: AO KASPERSKY LAB, Moscow (RU)

( * ) Notice: Subject to any disclaimer, the term of this patent is extended or adjusted under 35 U.S.C. 154(b) by 41 days.

(21) Appl. No.: 15/007,790

(22) Filed: Jan. 27, 2016

(65) Prior Publication Data

US 2017/0005983 A1    Jan. 5, 2017

(30) Foreign Application Priority Data

Jun. 30, 2015    (RU) .................. 2015125968

(51) Int. Cl.
| | | |
|---|---|---|
| *G06F 11/00* | (2006.01) | |
| *H04L 29/06* | (2006.01) | |
| *G06F 21/62* | (2013.01) | |

(52) U.S. Cl.
CPC ...... *H04L 63/0209* (2013.01); *G06F 21/6281* (2013.01); *H04L 63/1408* (2013.01); *H04L 63/20* (2013.01); *G06F 2221/2141* (2013.01)

(58) Field of Classification Search
CPC . H04L 63/1408; H04L 63/20; G06F 21/6281; G06F 2221/2241; G06F 2221/2141

(Continued)

(56) References Cited

U.S. PATENT DOCUMENTS 7,249,379 B2    7/2007    Larsen
7,386,885 B1 *  6/2008    Kaspersky ............ G06F 21/52
                                                    713/164

(Continued)

FOREIGN PATENT DOCUMENTS

WO    WO02103498    12/2002

OTHER PUBLICATIONS

Spencer et al., "The Flask Security Architecture: System Support for Diverse Security Policies", Aug. 1999. http://www.cs.utah.edu/flux/papers/flask-usenixsec99-abs.html.

(Continued)

*Primary Examiner* — Saleh Najjar
*Assistant Examiner* — Peiliang Pan
(74) *Attorney, Agent, or Firm* — Patterson Thuente Pedersen, P.A.

(57) ABSTRACT

A computer security architecture applies selected rules from among a set of rules defining one or more security policies to a given set of security context parameters to produce security verdicts, each representing whether a certain action requested by a subject entity is permissible. Each security policy is associated with a corresponding communication interface. A plurality of gateway engines are each associated with at least one of the subject entities and dedicated to interfacing with the security server. Each of the gateway engines carries out monitoring of requested actions by the associated subject entity and, for each requested action, identifies a security context. A security policy is determined for the requested action based on a corresponding security context, and a security verdict is obtained via a communication interface corresponding to the applicable security policy.

22 Claims, 6 Drawing Sheets

(58) Field of Classification Search
USPC .................................. 726/17, 22; 713/164
See application file for complete search history.

(56) References Cited

U.S. PATENT DOCUMENTS

| | | | |
|---|---|---|---|
| 7,805,509 B2* | 9/2010 | Alon .................. | H04L 47/10 370/252 |
| 8,627,451 B2 | 1/2014 | Walsh | |
| 2006/0212931 A1* | 9/2006 | Shull .................. | G06F 21/55 726/10 |
| 2008/0141338 A1 | 6/2008 | Kim et al. | |
| 2009/0158385 A1 | 6/2009 | Kim et al. | |
| 2009/0313639 A1* | 12/2009 | Davis ................ | G06F 11/2294 719/317 |
| 2010/0131956 A1* | 5/2010 | Drepper .............. | G06F 9/5011 718/104 |
| 2010/0205475 A1* | 8/2010 | Ebrahimi ............ | G06F 21/6227 714/2 |
| 2012/0167157 A1 | 6/2012 | Walsh et al. | |
| 2012/0255013 A1* | 10/2012 | Sallam ................ | G06F 21/568 726/24 |

OTHER PUBLICATIONS

Provos, "Improving Host Security with System Call Policies", Security '03 Paper. Center for Information Technology Integration. University of Michigan. Aug. 27, 2003. http://static.usenix.org/publications/library/proceedings/sec03/tech/full_papers/provos/provos_html/.

Nimbalkar et al., "Advanced Linux Security", American Journal of Engineering Research. vol. 02, Issue 03. 2013. http://www.ajer.org/papers/v2(3)/B0230712.pdf.

Backes et al., "Android Security Framework: Enabling Generic and Extensible Access Control on Android", Saarland University. Germany. Apr. 4, 2014 http://arxiv.org/pdf/1404.1395.

Bugiel et al., "Towards a Framework for Android Security Modules: Extending SE Android Type Enforcement to Android Middleware", Germany. Feb. 20, 2013 https://www.tk.informatik.tudarmstadt.de/fileadmin/user_upload/Group_TRUST_/PubsPDF/flaskdroid_tr.pdf.

European Search Report for EP Application No. 16162950 dated May 17, 2016.

Smalley et al., "The Flask Security Architecture: System Support for Diverse Security Policies", Apr. 30, 2002.

* cited by examiner

COMPUTER SECURITY ARCHITECTURE AND RELATED COMPUTING METHOD

RELATED APPLICATION

This Application claims the benefit of Russian Federation Application No. 2015125968 filed Jun. 30, 2015, the content of which is incorporated by reference herein.

TECHNICAL FIELD

The invention relates generally to information systems security and, more particularly, to a security arrangement in which general information processing functionality is separated from security-ensuring operations.

BACKGROUND

Today's computer and software technology solves a broad spectrum of tasks, ranging from simple ones like playing games or creating documents, to incredibly complex ones, such as controlling industrial facilities. Such computerization acutely raises the need of ensuring computer security. Security is important for the users of home computers, since malicious software, such as viruses, computer worms and Trojan programs, is quite widespread and can be a tool for committing serious cybercrimes, such as theft of funds from bank accounts. But the security matters are especially important for critical infrastructure facilities and for industrial systems. For example, the Stuxnet computer worm demonstrated that software already exists which can be used as a tool for unauthorized data collection and for sabotaging automated process control systems (APCSs) of industrial companies, power plants, airports and other facilities of critical importance. Ensuring security is a very important issue which must be resolved in real time during the operation of home computers and industrial systems.

At present, software has its own security-related functionality, which can exist separately or jointly with the security functionality of the operating system. In other words, security and functional logic can be united in today's operating systems and software. This approach has its drawback. For example, an offender utilizing errors in functional logic and zero-day vulnerabilities can often bypass the assigned security level. An example can be a TCP/IP stack—a set of network protocols in which a protocol located at a higher level operates "over" the lower one, using encapsulation mechanisms. This set of protocols is functionally designed for transfer of information on a network. At the same time, Microsoft Corporation's operating systems contained a vulnerability due to an error in a TCP/IP stack during the processing of IPv4 packets. A remote user was able to end the system's operation using a specially created packet. Another example is the NTFS file system, which has its own security mechanisms—for example, access differentiation. Thus, the NTFS driver which initiates access to information blocks on the disc also performs access control. If these security functions are removed from the driver, the NTFS file system will become vulnerable to a number of possible attacks.

Moreover, the mechanisms for protection of the existing OSs are insufficient to meet confidentiality and integrity requirements imposed on information systems. The diversity of information systems and applications launched in them creates a large list of various security requirements which necessitate the use of various types of security policies. A security architecture must be sufficiently reliable and flexible to support a large number of security policies.

As an example of a security architecture for automated systems, the Flask mandate access control architecture was proposed; it was developed by the National Security Agency (NSA) jointly with Secure Computing Corporation (SCC) and based on the Type Enforcement (TE) mechanism. The Flask architecture was integrated into the Linux OS's kernel. This project was titled SELinux (Security Enhanced Linux).

Under the Flask architecture, a separate component is allocated in the OS, called a security server, within which the security policy is implemented. The security server provides a specific programming interface to the other components of the OS, thereby allowing the other components to receive security policy solutions. The other components of the OS are called object managers. For example, the file system is a file manager. The Flask architecture defines only the interface provided by the security server to the object managers. In SELinux, the security server supports the following three access control mechanisms: type enforcement (TE—Type Enforcement), role-based control (RBAC—Role Based Access Control) and multi-level security (MLS—Multi-Level Security). These security models are hard-written in the architecture, and any changes of this list will cause the need to make changes to the main components of the architecture (i.e. to the security server and to the object managers).

The above-described examples suffer from the problem of lack of differentiation between functionality and security. Any software module which ensures both functionality and security, if hacked by an offender, allows the offender to bypass system security and, for example, to raise the privileges of a process required to perform the offender's actions.

SUMMARY

One aspect of the invention is directed to a system for providing a computer security architecture. The system includes computing hardware, including at least one processor, a data store, and input/output facilities interfaced with the at least one processor. The data store contains an operating system and a plurality of subject entities executable by the at least one processor. Examples of subject entities include computer systems, application programs, processes, network devices, mobile telephones, various devices in an industrial infrastructure, and the like.

The data store further contains a security subsystem executable by the at least one processor, that, when executed, causes the computing hardware to implement a security server engine, a plurality of gateway engines, and a security enforcement engine.

The security server engine is configured to apply selected rules, from among a set of rules defining one or more security policies, to a given set of security context parameters. This produces a security verdict representing whether a certain action requested by a subject entity is permissible, with each of the one or more security policies being associated with a corresponding communication interface.

Each one of the plurality of gateway engines is associated with at least one of the subject entities and is dedicated to interfacing with the security server. Each of the gateway engines is configured to monitor requested actions by the associated subject entity and, for each requested action detected, identify a security context, determine an applicable security policy for the requested action based on a corresponding identified security context, and request a security verdict from the security server engine via a communication interface corresponding to the applicable security policy.

The security enforcement engine is configured to either permit or deny each of the requested actions according to the security verdict.

In a related aspect of the invention, a method for executing a computer security architecture includes applying selected rules from among a set of rules defining one or more security policies to a given set of security context parameters, to produce security verdicts, each security verdict representing whether a certain action requested by a subject entity is permissible, and each of the one or more security policies is associated with a corresponding communication interface. The method further includes executing a plurality of gateway engines, each gateway engine being associated with at least one of the subject entities and dedicated to interfacing with the security server. Each of the gateway engines carries out monitoring of requested actions by the associated subject entity and, for each requested action detected, identifying a security context.

An applicable security policy is determined for the requested action based on a corresponding identified security context, and a security verdict is obtained from among the produced security verdicts via a communication interface corresponding to the applicable security policy. A security enforcement decision is made to either permit or deny each of the requested actions according to the security verdict.

BRIEF DESCRIPTION OF THE DRAWINGS

The invention may be more completely understood in consideration of the following detailed description of various embodiments of the invention in connection with the accompanying drawings, in which.

Figure 1:
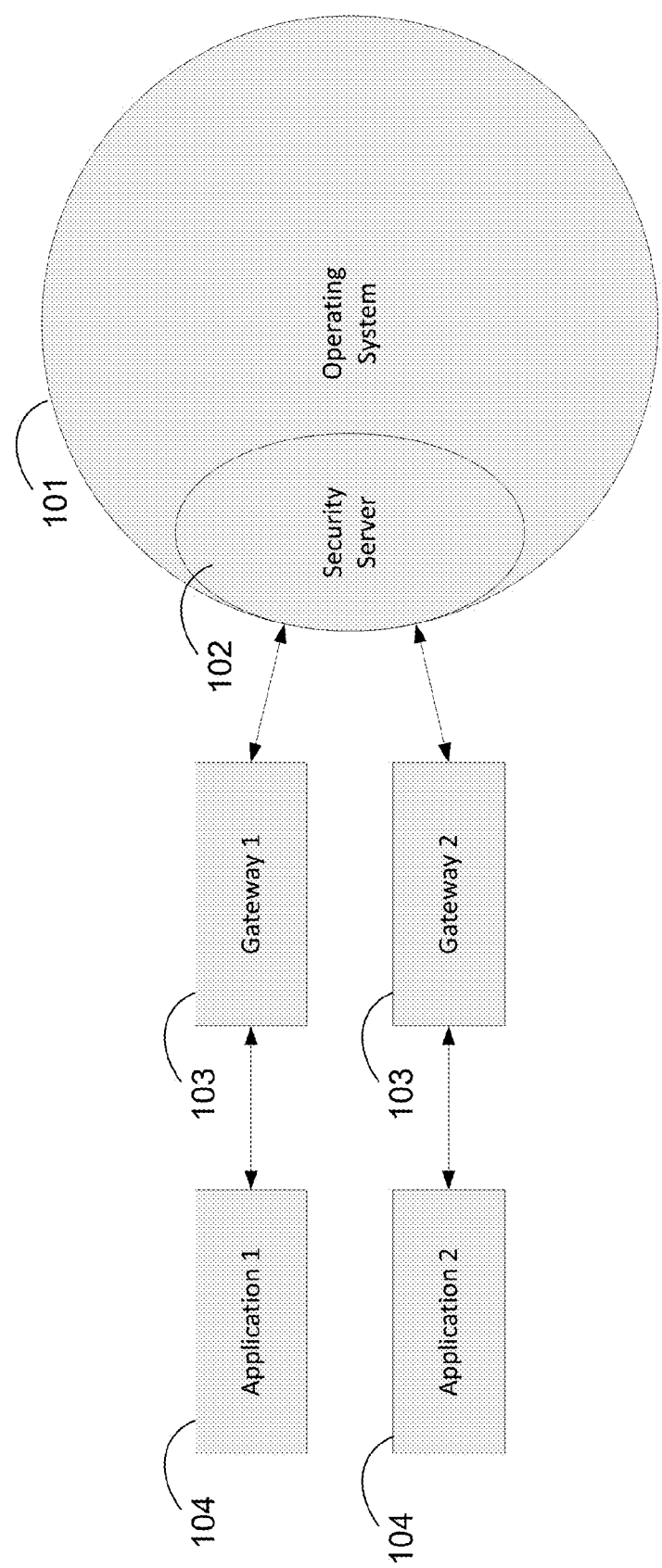
FIG. 1 is a diagram illustrating a basic example of the operation of applications with an operating system that implements a security architecture according to one embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

Aspects of the invention are directed to a new security architecture paradigm. Aspects of the present invention can be implemented as part of a computer system. The computer system can be one physical machine, or can be distributed among multiple physical machines, such as by role or function, or by process thread in the case of a cloud computing distributed model. In various embodiments, aspects of the invention can be configured to run in virtual machines that in turn are executed on one or more physical machines. It will be understood by persons of skill in the art that features of the invention may be realized by a variety of different suitable machine implementations.

The system according to various embodiments includes various engines, each of which is constructed, programmed, configured, or otherwise adapted, to carry out a function or set of functions. The term engine as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. A engine can also be implemented as a combination of the two, with certain functions facilitated by hardware alone, and other functions facilitated by a combination of hardware and software. In certain implementations, at least a portion, and in some cases, all, of a engine can be executed on the processor(s) of one or more computers that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of suitable configurations, and should generally not be limited to any particular implementation exemplified herein, unless such limitations are expressly called out. In addition, a engine can itself be composed of more than one sub-engines, each of which can be regarded as a engine in its own right. Moreover, in the embodiments described herein, each of the various engines corresponds to a defined functionality; however, it should be understood that in other contemplated embodiments, each functionality may be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Embodiments of the invention are described herein are directed to a security architecture in the context of an operating system with a microkernel architecture and, more specifically, with an example describing inter-process communication in such an operating system. Inter-Process Communication (IPC) is a set of procedures for providing data exchange between multiple threads in one or more processes. Processes may be launched on one or more computers connected by a network.

A fundamental principle of the exemplary security architecture is separation of information processing functions from the security-ensuring functions of such processing in accordance with pre-assigned requirements.

In order to implement this principle in a security architecture according to one embodiment, the responsibility for computing a verdict based on pre-assigned policies is distinct from the responsibility of applying the verdict. A component of the system, a security server, is responsible for computing the solutions, for example, the computed verdict or computed decision. In an embodiment, communication with this server occurs through a dedicated channel. The execution of actions in accordance with the decisions made by the security server is performed by a security infrastructure supported by the OS microkernel. According to an embodiment, in order to display the actions in the operating system on the security policy applied to determine the verdicts, security gateways (hereinafter referred to as "gateways") are used for active entities in the system. For example, security gateways can be used for active entities in the system to map (or associate) all possible actions by the entities to a plurality of security policies. Accordingly, the policies can then be applied to determine the verdicts.

The approach described according to this type of embodiment ensures conformity between assigned tasks and externally-supplied rules. Entities involved in solving problems may not have any knowledge about such rules or have any ability to control them. Any such capability must be explicitly defined in the security policy based on parameters, with defined responsibilities in the target system.

Similarly, the decision-making system has no information about the entities under its control, and is governed only by information required to control the policies and settings obtained from security gateways. Accordingly, the security architecture according to this embodiment implements the principle of segregation of responsibilities in authorization control.

FIG. 1 is a diagram illustrating a basic example of the operation of applications with an operating system that implements a security architecture according to one embodiment of the invention.

The computer system environment depicted in FIG. 1, in which the exemplary system for this embodiment operates on a computer system, such as a PC or a server, can include an operating system 101, a number of applications 104, and a security subsystem, which includes a security server 102 and gateways 103 respectively corresponding to the applications 104.

Applications 104 represent any application programs installed on the computer device. Each application 104 has its own functional capabilities, i.e. it can perform specific user tasks. Also, an application 104 can, for its operation, be set up to receive a specific type of information from the user. An application 104 can be an application for working with documents, a graphics editor, a web browser, or any special-purpose software, required, for example, to control an industrial process.

Operating system 101 comprises a set of inter-related processing and control programs that are logically positioned between the components of computer devices and the applications 104 and designed for performing various tasks. Such tasks can be connected with either the above-mentioned components or the applications 104. Thus, an operating system 101 performs the execution of requests from applications 104, such as access to data on media, allocation and de-allocation of memory, data input and output, and so on.

Any applications communicate with each other and with an operating system using programming interfaces. In computer systems, all communications are assigned a type and are based on the use of programming interfaces. For example, Application Programming Interfaces (APIs) allow a program to access another program in order to perform a specific operation or to gain access to data, as well as to receive requests from other programs. To ensure security, a check of the communication between applications using programming interfaces can be made.

In a security architecture according to one embodiment, gateways 103 are used in the communication between applications using programming interfaces. The purpose of a gateway 103 is to provide a channel through which an application 104 can communicate with the operating system 101 and with another application 104. Each application 104 can have its own gateway 103. The gateway 103 allows allocation of a security context associated with the attempt to perform an action (i.e., operation) using commands, such as API calls, sent through an interface. Such security context can be, for example, the time of the attempt to perform the action, the user ID that initiated the attempt to perform the action, the called method(s) invoked within the context of the requested action, an identifier of the entity that initiated the attempt to perform the action, an identifier of the entity that is the object to which the action is directed, the state of the applicable environment variables, the state of the entity (if the entity is an application, its status can be the value of a parameter that characterizes the current status of the application, such as "running"), or the security model parameters (e.g., Type Enforcement type, a mandatory access indicator, the user's role (in a RBAC model), information indicating a type, and any restrictions, on the session, information about available resources, etc.).

Also, the gateway 103 contains the names of the rules which can regulate the operation of the application 104, while the rules themselves are kept on the security server 102. Such rules can specify, for example, the interfaces which are permitted and prohibited to be used by the application 104, the time when the use of specific interfaces is permitted, and so on. The gateway 103 can send the name of the rule and the allocated security context to the security server 102. In other embodiments, the rule can be referenced by a rule identifier, hashed value, or other suitable lookup value. The security server 102 can be represented as a separate module provided in the operating system 101. The purpose of the security server 102 is to check the execution of the rules on the parameters from the provided security context in order to permit or prohibit the operation, namely, the execution of commands sent through the interface. If the operation is permitted by the security server 102, the commands will be processed by the operating system 101.

Figure 2:
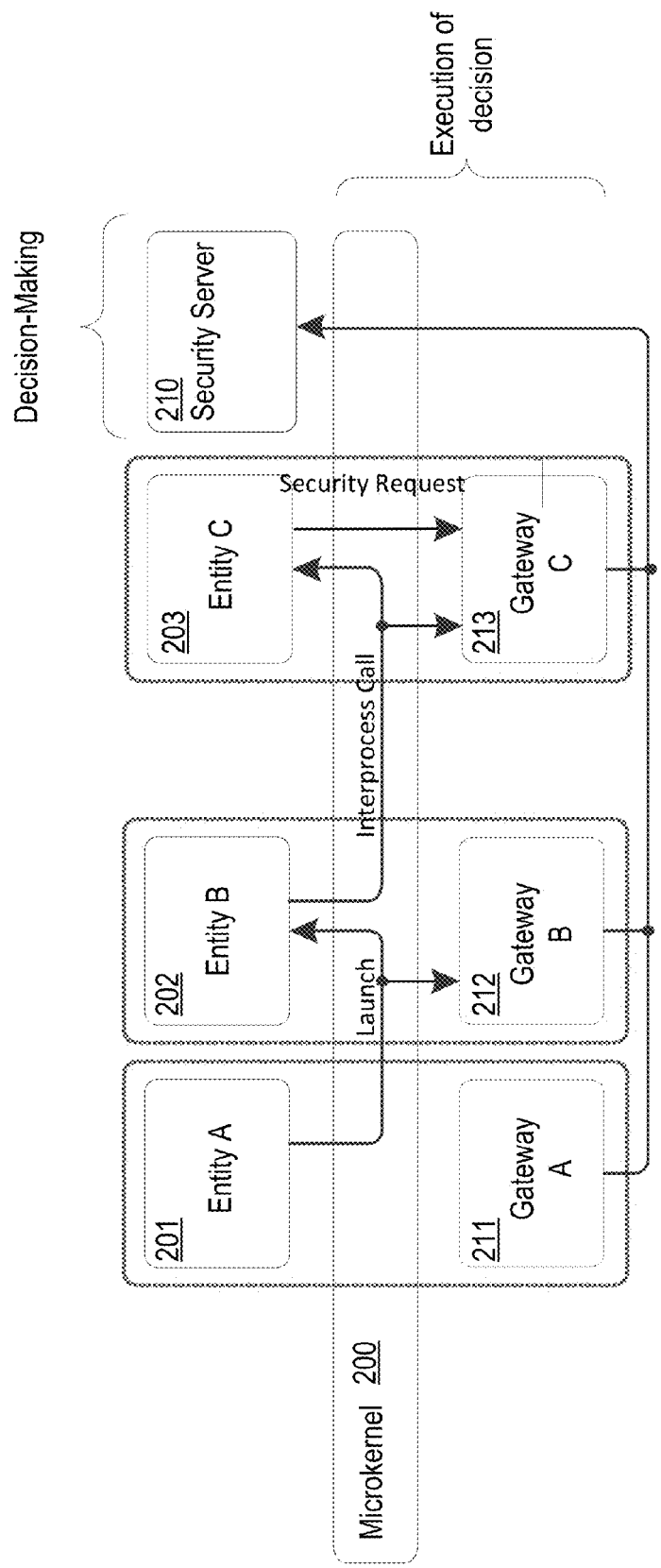
FIG. 2 is a diagram illustrating an exemplary security system according to one embodiment.

An exemplary security system according to one embodiment is illustrated in FIG. 2. In this embodiment, a microkernel operating system and an inter-process communication operation are described for illustration. The security system architecture depicted in FIG. 2 includes a microkernel 200, entities A, B and C indicated respectively by reference numerals 201, 202 and 203, gateways A, B and C indicated at 211, 212 and 213, corresponding to the above entities, as well as a security server 210.

The microkernel 200 ensures isolation of the entities from each other and provides mechanisms for communication between the entities. Therefore, the microkernel 200 guarantees interception of all interactions for monitoring purposes. An entity is an active component of the system, represented, from the security subsystem's point of view, by a security context. The activity of entities is manifested, among other ways, in the entities' ability to initiate actions subject to monitoring. Therefore, the actions performed by an entity in relation to another entity or to a security system are the object of decision-making in a security subsystem. A security context, represented as a data structure for instance, is identifiable by a unique security identifier (SID), which is non-transparent to the entity. In an embodiment, the SID is a first base component subject to decision-making. The call itself and its properties are the second base component.

In an inter-process communication, processes are treated as entities, while a set of parameters and attributes of each specific process are treated as the security context. Entities can also be more complex objects, such as network devices, personal computers, mobile telephones or various devices in an industrial infrastructure. Accordingly, the microkernel 200 can also be designed as an independent firmware complex used to carry out communication in the information system.

A resource in a security subsystem is an object of actions which are subject to security monitoring, but a resource cannot initiate such actions by itself. An example of a resource is a file, an identifiable memory area, a network interface, a printer, any other device. A resource, just as an entity, from the monitoring point of view, is represented by a security context identifiable in a security subsystem using a SID.

All communications between the entities 201, 202 and 203 are strictly typed and described in a language of specifications for describing interfaces, such as the special Interface Description Language or Interface Definition Language (IDL). All such communications, at the moment of being sent by the microkernel 200, are checked using the security server 210. The following code can be a simplest example of descriptions of interfaces of an entity for a file system in the IDL language:

```
package FileSystem
typedef sequence<Char, 255> Path;
typedef sequence<UInt8, 4096> Buffer;
typedef SInt32 Result;
typedef SInt32 FileDescr;
interface IFileSystem {
    open(in Path name, in UInt32 mode, out FileDescr fd);
    read(in FileDescr fd, in UInt32 pos; in UInt32 len, out Buffer buf, out
        Result retcode);
    write(in FileDescr fd, in UInt32 pos; in UInt32 len, in Buffer buf, out
        Result retcode);
}
interface IFileSystemSecurity {
    open(in Label label);
    read( );
    write( );
}
```

Two interfaces are described in the above example—the main interface for communication with the file system, IFileSystem, and the security interface, IFileSystemSecurity. Within each interface, three main communication methods are described: open, read and write. For illustration purposes, below is an example of a description of the interfaces of an entity for a belt conveyor with a drill in the IDL language:

```
package Factory
interface IFactory {
    BeltOn( );   /* Turn the conveyor on */
    BeltOff( );  /* Turn the conveyor off */
    DrillOn( );  /* Turn the drill on */
    DrillOff( ); /* Turn the drill off */
    DrillDown( ); /* Lower the drill bit */
    DrillRaise( ); /* Raise the drill bit */
}
```

The security server 210 can also be treated as an entity, i.e. a process in the example of inter-process communication, for which there is a description in the IDL language of its interface. The security server 210, as well as the microkernel 200, can be designed as an independent firmware complex used to check messages in an automated system. The special CFG language (security configuration language) can be used to describe the security configuration of the security server 210.

The security configuration of the security server 210 includes rules implementing various security policies. On the basis of the configuration of the security server 210, special gateways 211, 212 and 213 are built. In the current inter-process communication example, the gateways 211, 212 and 213 can be built automatically, by compiling a configuration written in the CFG language.

To better aid in understanding the configuration of the security server 210, below is an example involving the task of implementing a security policy for filtering URL-calls from a web browser using a whitelist of domain addresses, where only addresses with *.kaspersky.com and *.securelist.com masks are permitted. Solving this task utilizes a proxy server through which access to the Internet will be provided. The web browser and the proxy server will be separate entities; the interaction between them will be checked by the security server 210 for compliance with the URL requests filtering policy. The description of the interfaces of the proxy server in the IDL language appears as follows according to the present example:

```
package proxyserver
typedef sequence<Char, 1024> String;
typedef sequence<Char, 16384> Data;
interface IHTTP {
    http_get (in String host, in UInt32 port, in String uri, out Data data);
}
```

This description of the proxy server interfaces provides only one method, http_get, which issues a web page (data) using three parameters—a domain name of a host, a port value, and a resource identifier (uri). Then the implementation of a security policy within a security server 210 can be used to filter the URL requests from a web browser using a whitelist of domain addresses, which can be described in the CFG language as follows:

```
01 use call policy allow = secsrv.policies.basic.allow;
02 use call policy match = secsrv.policies.string.match;
03 use call policy eq = secsrv.policies.arith.eq_uint32;
04 entity Proxy Server {
05     call in http_get(proto, host, port, uri) = match
           ["*.kaspersky.com", "*.securelist.com"] (host), eq 443 (port);
06     call out http_get (data) = allow;
07 }
```

Below is a more detailed discussion of what is described in each string of this security policy implementation option. String 01 declares the use of a basic and most simple security policy, which allows any communication when using this policy. String 02 declares the use of a security policy containing the rules for comparison of strings for a match. String 03 declares the use of a security policy containing the rules for detecting number matches (number equality). Strings 04-07 describe the security configuration for the proxy server entity where the host's domain name and the port value must be checked by the match and eq policies for compliance with the values defined in the security policy ("*.kaspersky.com" or "*.securelist.com" for the host's domain name and 443 for the port), in order for the web page to be displayed in the web browser.

The security policy, as shown in the above example, can be built from other security policies, which allows creation of complex security policies as a combination of simpler security policies. Therefore, the flexibility of the presented security policy is conditioned not only by the presence of a security server and of multiple gateways, which allows for the easy implementation of new policies without interfering with the system components functioning process, but also affords the option of building new security policies from existing ones. The creation of new security policies from existing ones eliminates the need to write security policies from scratch. Writing a new security policy from scratch increases the likelihood of the existence of vulnerabilities in it, and, moreover, such policies often turn out to be too specific and cannot be reused in the same system. Also, each time a security policy is reused in a system, the system's security is increased, because writing new policies increases the size of the system's code, which increases the attack surface, and therefore increases the system's vulnerability and complicates the process of support and administration of such a system.

The building of requests for the security server 210 for validating an entity's actions is the responsibility of a gateway related to the entity. The gateway is initialized at the start of the entity and connects with it. All subsequent actions, including the initialization of the security context and the monitoring of the communication of the related entity, are executed in accordance with the rules assigned by the gateway's configuration. The security configuration has a two-level reference structure, which includes the following:

a system configuration; and a configuration of the reflection of the actions to the security policy (hereinafter referred to as "the reflection configuration"). In an embodiment, reflection can also be referred to as "mapping" the actions to the security policy.

The system configuration describes the aspects of the implementation of security functions within a certain security model, which apply to the system as a whole.

The reflection configuration describes the rules of the application of the policies to an entity's actions, which apply to each entity. The reflection configuration is used when creating an entity for the initialization of its gateway. The gateway subsequently stores the references to the security policies related to the entity and calls up these policies to validate its actions.

A security gateway, therefore, connects the application software and the security model in the system, by indicating which program actions must be regulated by which security policies. In this case, a gateway does not have any other information on actions or policies than the references to them. According to an embodiment, the policies requested by the gateway are computed by the security server 210.

The reflection configuration contains references to the security policies applied when an entity performs security-related actions:

start of entities (it is reflected to the policy of initialization of a child's entity's security context and of the authorization control);

communication of a message between entities (it is reflected to the interaction monitoring policies);

an entity's request using the security interface (it is reflected to the interaction monitoring policies).

Any applied operations in a system can be performed using statically-defined entity interfaces. These interfaces are realized using typed requests within inter-process communication. Permission or denial of applied operations performed using such actions is made based on the verdict computed by the security server 210.

Although all actions are ultimately performed within inter-process communications, the three above-listed types of actions are distinguished by an execution algorithm and monitored by a security subsystem: the start of an entity, the communication of a message between entities, and a request using the entity's security interface. Described below is the sequence of communications between the components of a security subsystem for the application of security solutions for the three types of action within inter-process communication.

The start of an entity is performed as follows:

an entity A 201 requests the creation of an entity B 202 by calling up the operating system kernel interface;

the microkernel creates a gateway for a child entity B 202;

the gateway B 212 of the child entity B 202 sends the SIDs of the parent and child entities, the initialization policy and the permission policy to the security server;

the security server 210 permits a reference to the security context of the parent entity A 201, initializes the security context of the child entity B 202, and issues a security verdict;

if the verdict is positive, the microkernel permits the creation of the entity B 202;

if the verdict is negative, the microkernel removes the gateway B 212 of the entity B 202 and returns an access error message.

The gateway A 211 of the parent entity does not participate in the initialization of a new security context (although the parent entity context can be inherited by the child entity's context during initialization, in an embodiment). The security subsystem does not store information on the newly created entities tree, either. The communication between the parent and child entities (after the creation of the latter) is regulated depending on the security configuration, in the same manner as their communication with all other entities.

The transfer of the message is performed with the participation of two entities—entity B 202, which initiated the sending of the message, and entity C 203. The transmission of the message is monitored depending on the security context and gateway C 213, the security context and gateway B 212, and on the message content. In an embodiment, in order to validate the message, it is sufficient to use only one of the gateways, and, generally, only the gateway of the receiving gateway, i.e. gateway C 213.

The transmission of the message is monitored as follows:

entity B 202 requests transmission of the message to entity C 203 by calling up a function of the operating system's kernel;

the microkernel compares entity's C 203 gateway C 213 with the entity;

gateway C 213 reflects the request onto the security policies;

gateway C 213 calls the security server 210, transmitting references to policies, the SIDs of the security contexts of entity B 202 and of entity C 203, and the selected parameters of the message (which the policies may need) for the computation of a security verdict;

the security server 210 computes the verdict;

if the verdict is positive, the transmission of the message is permitted;

in the opposite case, the transmission of the message is forbidden, and an error message is returned.

If an actual security verdict is present in the cache, gateway C 213 may not call the security server 210. The computed security verdict can be cached for further use.

The possibility to monitor the communication not only by the security context of the communicating parties, but also by the message content, allows the implementation of a broad range of policies. Such policies can include not only transmission/reception, but also policies incorporating filtration of messages by content or interface, etc.

A call through the security interface is made when the entity needs to notify the security subsystem of its internal events or request another service.

A call through the security interface is used, in particular, to manage the monitoring of the access to protected resources. As mentioned above, no gateway is compared to the resources. Therefore, in order to monitor access to the resources, an intermediary entity is used that requests a verdict of the security server 210 using its own security interfaces.

The issuance of a security verdict using a security interface is, in the general case, performed as follows:
- entity C 203 makes a request, using the security interface, for the gateway C 213 compared to itself, transmitting the necessary parameters;
- gateway C 213 reflects the request onto the security policies;
- if there is no actual verdict in the cache, gateway C 213 makes a request for the security server 210 for computation of a security verdict, transmitting the necessary parameters;
- the security server 210 computes the security verdict;
- gateway C 213 returns the security verdict to entity C 203.

If an actual security verdict is present in the cache, gateway C 213 may not call the security server 210. The security verdict can be cached for further use.

An example can be a model of a document turnover system—actors with different access levels (secret, top secret, not secret), which can read/write from/to one another. A read operation is allowed only when the reader's access level is greater or equal to the access level of the actor being read, while a write operation is allowed only in the opposite case.

In the configuration of a security system for all entities controlled by the above-described security model, the following rules are specified: for "read" and "write" messages—perform a comparison of access levels. At the moment of the transfer of a message, the system, using the message's attributes, determines the message's type. Knowing the security contexts of the involved entities and using the security configuration, the relevant gateway determines a policy which is calculated by the security server 210 in order to receive a verdict. The security server 210, in accordance with the access policy, using access levels from the security contexts, performs the comparison and sends its verdict to the security system.

Figure 3:
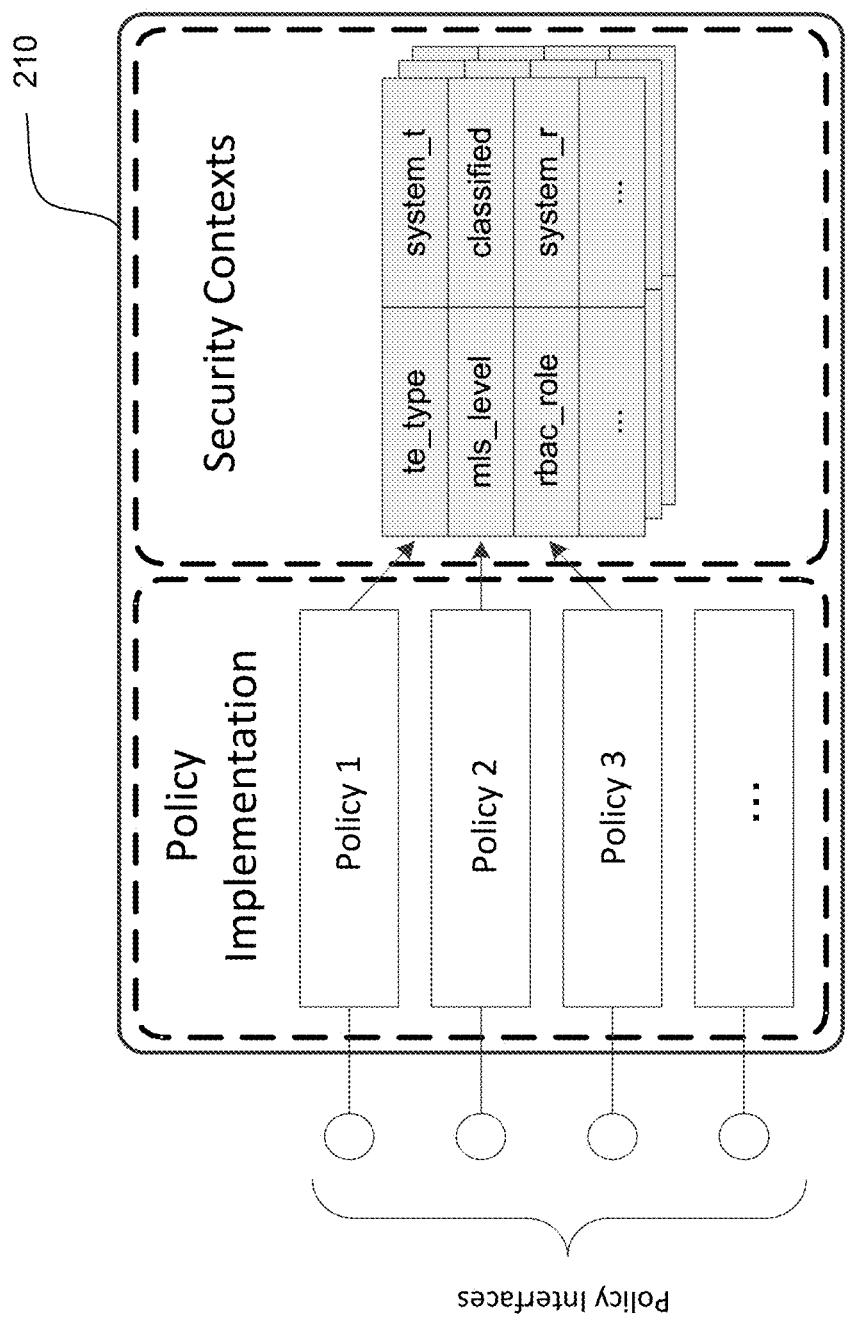
FIG. 3 is a diagram illustrating a security server according to one embodiment of the invention.

FIG. 3 illustrates a security server 210. The main task of the security server 210 is to calculate security policies, or, in other words, to make a security verdict regarding the messages in the system. The security server 210 has extensive knowledge about the security policies used in the security architecture—e.g., the types of the security policies and their specific design in the form of rules which operate parameters from the security contexts. The security policies can belong to various security models—for example, models using type enforcement (TE) mechanisms, Role-Based Access Control (RBAC), and multi-level security (MLS). Also, security policies can be built based on mandate access control models, which determine the access level for each process (entity), while all resources (files, directories, sockets, etc.) in such models are matched with a specific type (secrecy level), and a list of rules is built which restrict the entities' capabilities of accessing specific types. Another example of a security model is the Bell-LaPadula model, in which all actors (processes) and objects (files) have their own clearance level. An actor with a specific clearance level is allowed to read and create (write/update) objects with the same clearance level. In addition, the actor is allowed to read less secret objects and to create objects of a higher level. An actor will never be able to create objects with a clearance level lower than its own, or to read an object with a higher clearance level. It will be understood that these are just some of a broader set of examples.

For each implementation of a security policy on a security server 210, an interface is allocated through which a gateway can request calculation of the message's security verdict in relation to a specific security policy. The security server 210 operates outside of the functional logic of the entities and is only able to calculate the relevant security policies, based on the data received by a specific interface from a gateway, and to return the verdict to the requesting gateway. For example, if we consider a security policy implementation option which uses a combination of three policies, which are respectively described in terms of one of the above-mentioned access control mechanisms—TE, RBAC and MLS, —then, from the gateway point of view, the security server 210 will be represented by three interfaces, one for each of the above-listed policies. And, for each message, the gateway will request the security server 210 to compute a verdict on all three interfaces. The verdict, in turn, will represent a conjunction of the results of the computation of each policy (TR && RBAC && MLS).

Figure 4:
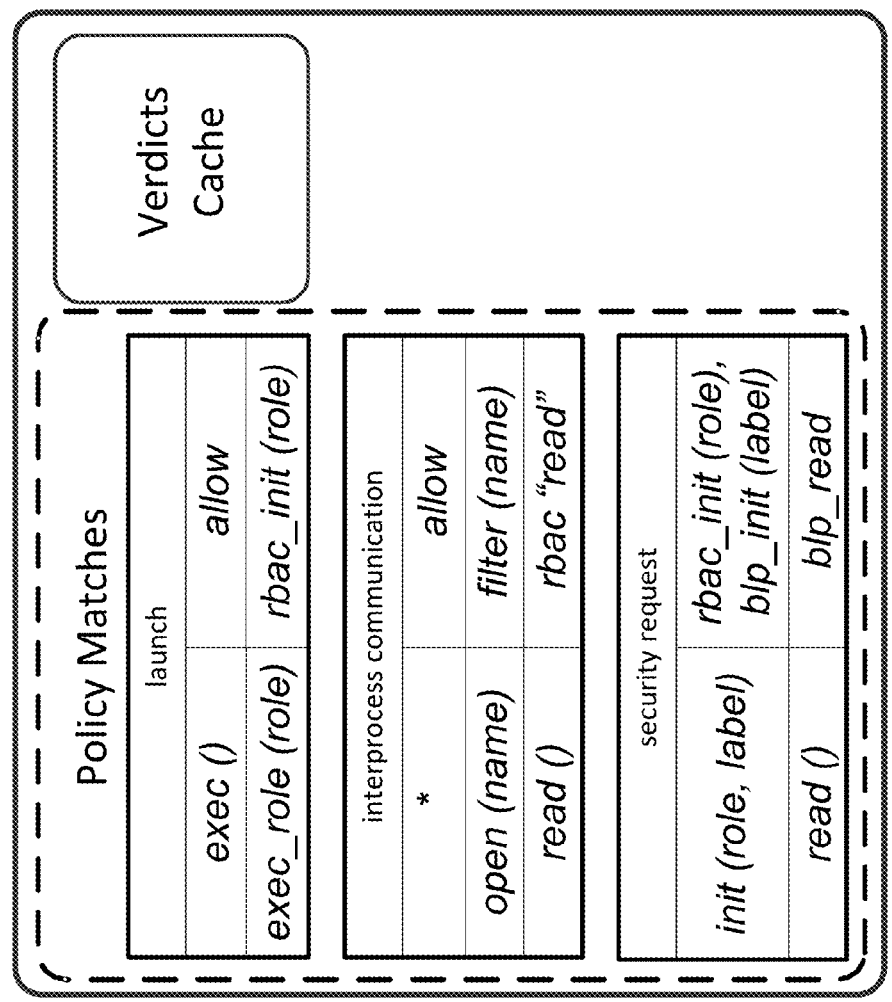
FIG. 4 is a diagram illustrating a gateway according to one embodiment of the invention.

FIG. 4 shows a basic diagram of a gateway 211, according to an embodiment. The main tasks of a gateway are as follows: determine the specific communication method in the system messages and the security policy corresponding to it; identify the security context related to the entities communicating in the message; and request a security verdict from the security server 210, sending the security context to the relevant interface of the security server 210. Gateway 211 compares multiple security policies, the computation of which needs to be requested from the security server in order to compute a verdict, with each monitored event of the respective entity 201. In order to optimize the operation of the security system represented by this security architecture, all security verdicts received from the security server 210 regarding the entity 201 are saved in the gateway 211's verdicts cache.

The key in the verdicts cache can be composed of identifiers of the security contexts of the participating entities, an event identifier (composed of the security server 210 interface number and of the communication method number in the system message) and of the value of method arguments used when computing the verdict (if they were specified in the gateway configuration).

Each time the gateway makes a request for the security server 210 for the computation of a verdict, it checks whether there is an existing verdict on that event in the verdicts cache. If there is one, the gateway immediately returns the verdict; otherwise, it sends a request to the security server 210.

Figure 5:
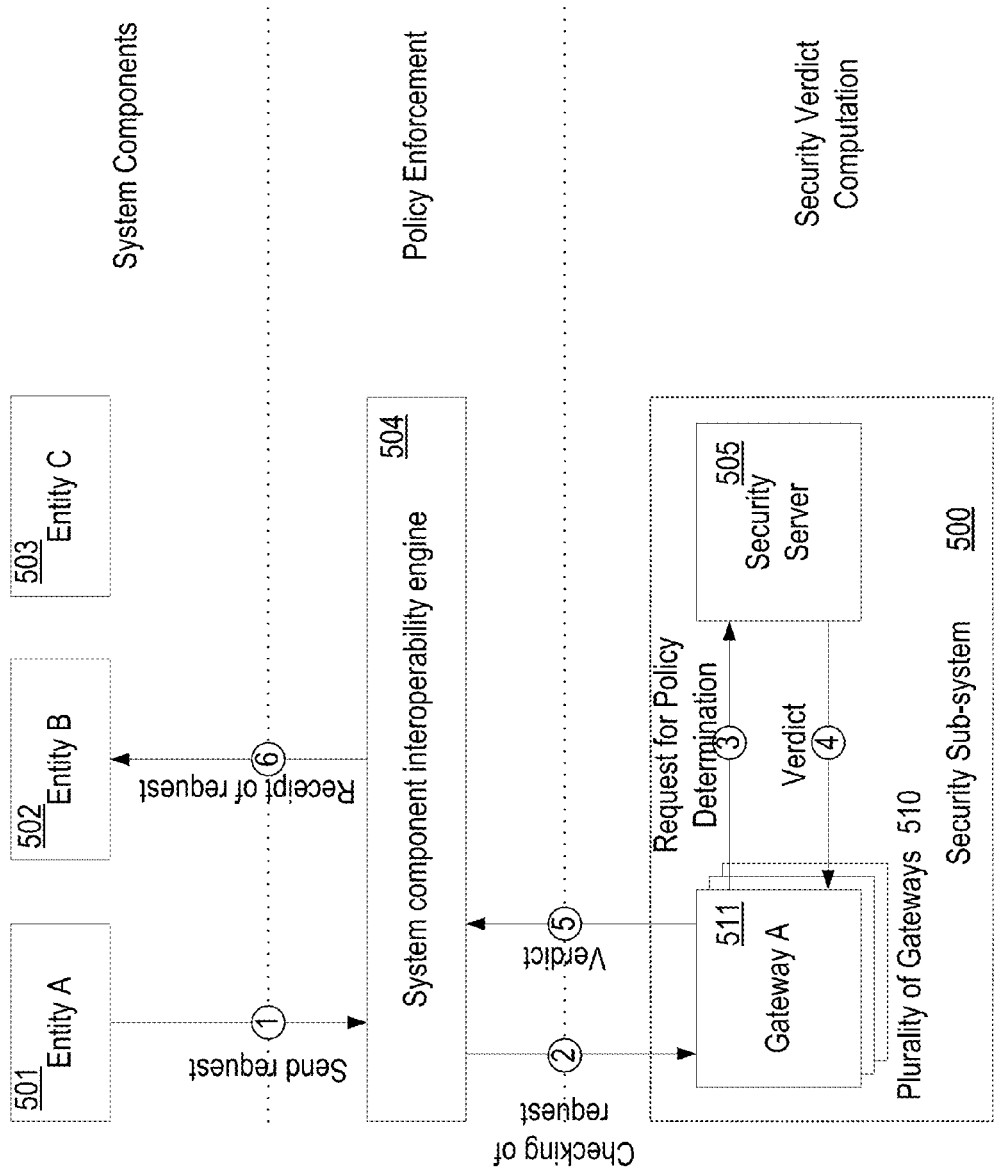
FIG. 5 is a diagram illustrating a basic embodiment of a security architecture according to some aspects of the invention.

FIG. 5 illustrates a basic embodiment of a security architecture according to some aspects of the invention. The security architecture within this option is composed of three levels:

a system component level, at which entities 501, 502 and 503 are implemented;

a security policies enforcement level, implemented by the system components communication tool 504; and a verdict computation level, at which a security subsystem 500 is implemented, which includes multiple gateways 510 and a security server 505.

The system component level is composed of multiple entities. In an embodiment, each of the entities implements a separate component; for example, a file system or an application within an operating system, or a control panel, a conveyor or a machine within an industrial system. The entities communicate with each other by sending and receiving messages with requested actions. Each entity can have a number of parameters (or attributes), which characterize both the entity itself, for example, its unique ID, and its state, for example, "On" or "Off". All communications and parameters within entities can be described in terms of a security policy.

A security server 505, implemented at the verdicts computation level, uses multiple rules, defined within one or multiple security policies, and a security context for the issuance of a verdict, which defines whether the execution of the requested action is permitted, where a security context is a set of parameters characterizing the entity in the process of its execution.

For each message intercepted by the system components communication tool 504, the respective gateway from a set of gateways 510 performs the following:

based on the security context in accordance with its own configuration, the gateway determines a set of policies applicable for that type of communication;

the gateway requests computation of that set of policies from the security server 505;

based on the results of the computation of the set of policies, the gateway defines the final verdict;

the gateway sends the verdict for enforcement to the system components communication tool 505.

As described above with respect to certain embodiments, for each implementation of a security policy within a security server 505, an interface is dedicated through which the gateway can request computation of a security verdict for a message in relation to a specific security policy. A gateway can also request computation of a verdict for a set of policies by sending requests to the relevant interfaces of the security server 505, and, having received a verdict from the server on each request (i.e. a set of verdicts), the gateway can define a final verdict, for example, using the conjunction method. Therefore, the final verdict will be positive only if each of the verdicts received from the security server 505 was positive.

The system components communication tool 504, implemented at the security policies enforcement level, is designed to monitor the execution of the entities, to manage communications between entities, and to directly communicate with the existing gateways from the set of gateways in order to receive and enforce verdicts. The verdicts can be represented either as simple Boolean values, where 0 means "denied" and 1 means "permitted," or as more complex combinations of any characters (letters, numbers and special symbols), including known words, such as "restart/pause/activate entities".

Figure 6:
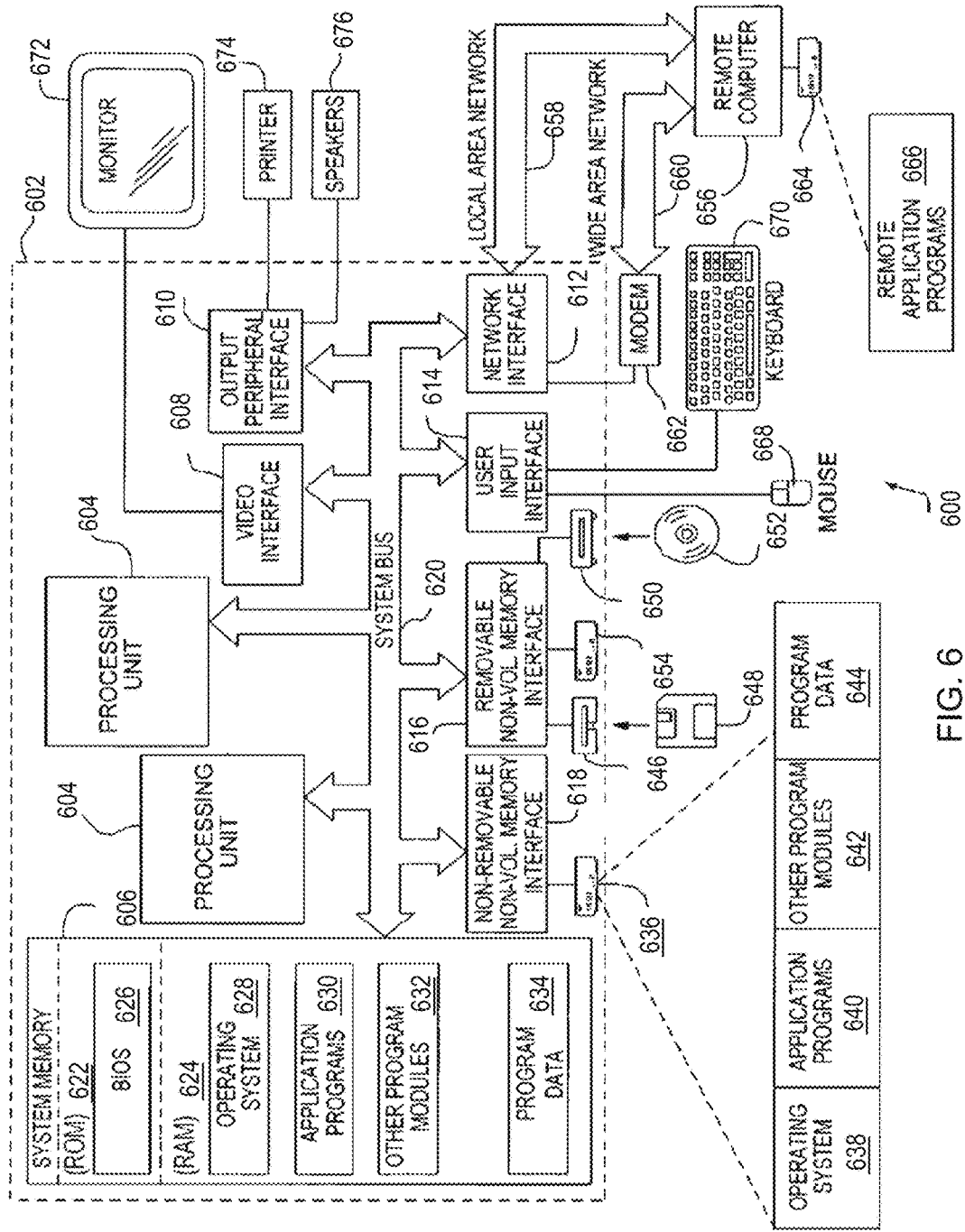
FIG. 6 is a diagram illustrating a computer system 600 on which aspects of the invention as described herein may be implemented according to various embodiments.

FIG. 6 is a diagram illustrating a computer system 600 on which aspects of the invention as described herein may be implemented according to various embodiments. The computer system 600 may include a computing device such as a personal computer 602. The personal computer 602 includes one or more processing units 604, a system memory 606, a video interface 608, an output peripheral interface 610, a network interface 612, a user input interface 614, removable 616 and non-removable 618 memory interfaces and a system bus or high-speed communications channel 620 coupling the various components. In various embodiments, the processing units 604 may have multiple logical cores that are able to process information stored on computer readable media such as the system memory 606 or memory attached to the removable 616 and non-removable 618 memory interfaces 618. The computer 602 system memory 606 may include non-volatile memory such as Read Only Memory (ROM) 622 or volatile memory such as Random Access Memory (RAM) 624. The ROM 622 may include a basic input/output system (BIOS) 626 to help communicate with the other portion of the computer 602. The RAM 624 may store portions of various software applications such as the operating system 628, application programs 630 and other program engines 632. Further, the RAM 624 may store other information such as program or application data 634. In various embodiments, the RAM 624 stores information that requires low-latencies and efficient access, such as programs and data being manipulated or operated on. In various embodiments RAM 624 comprises Double Data Rate (DDR) memory, Error Correcting memory (ECC) or other memory technologies with varying latencies and configurations such as RAMBUS or DDR2 and DDR3. In this way, in various embodiments, the system memory 606 may store the input data store, access credential data store, operating memory data store, instruction set data store, analysis result data store and the operating memory data store. Further, in various embodiments, the processing units 604 may be configured to execute instructions that limit access to the aforementioned data stores by requiring access credential before access to the information is granted.

The removable 616 and non-removable 618 memory interfaces may couple the computer 602 to disk drives 636 such as SSD or rotational disk drives. These disk drives 636 may provide further storage for various software applications such as the operating system 638, application programs 640 and other program engines 642. Further, the disk drives 636 may store other information such as program or application data 644. In various embodiments, the disk drives 636 store information that doesn't require the same low-latencies as in other storage mediums. Further, the operating system 638, application program 640 data, program engines 642 and program or application data 644 may be the same information as that stored in the RAM 624 in various embodiments mentioned above or it may be different data potentially derivative of the RAM 624 stored data.

Further, the removable non-volatile memory interface 616 may couple the computer 602 to magnetic portable disk drives 646 that utilize magnetic media such as the floppy disk 648, Iomega® Zip or Jazz, or optical disk drives 650 that utilize optical media 652 for storage of computer readable media such as Blu-Ray®, DVD-R/RW, CD-R/RW and other similar formats. Still other embodiments utilize SSD or rotational disks housed in portable enclosures 54 to increase the capacity of removable memory.

The computer 602 may utilize the network interface 612 to communicate with one or more remote computers 656 over a local area network (LAN) 658 or a wide area network (WAN) 660. The network interface 612 may utilize a Network Interface Card (NIC) or other interface such as a modem 662 to enable communication. The modem 662 may enable communication over telephone lines, coaxial, fiber optic, powerline, or wirelessly. The remote computer 656 may contain a similar hardware and software configuration or may have a memory 664 that contains remote application programs 666 that may provide additional computer readable instructions to the computer 602. In various embodiments, the remote computer memory 664 can be utilized to store information such as identified file information that may be later downloaded to local system memory 606. Further, in various embodiments the remote computer 656 may be an application server, an administrative server, client computers, or a network appliance.

A user may enter information to the computer 602 using input devices connected to the user input interface 614 such as a mouse 668 and keyboard 670. Additionally, the input device may be a trackpad, fingerprint scanner, joystick, barcode scanner, media scanner or the like. The video interface 608 may provide visual information to a display such as a monitor 672. The video interface 608 may be an embedded interface or it may be a discrete interface. Further, the computer may utilize a plurality of video interfaces 608, network interfaces 612 and removable 616 and non-removable 618 interfaces in order to increase the flexibility in operation of the computer 602. Further, various embodiments utilize several monitors 672 and several video interfaces 608 to vary the performance and capabilities of the computer 602. Other computer interfaces may be included in computer 602 such as the output peripheral interface 610. This interface may be coupled to a printer 674 or speakers 676 or other peripherals to provide additional functionality to the computer 602.

Various alternative configurations and implementations of the computer 602 are within the spirit of the invention. These variations may include, without limitation, additional interfaces coupled to the system bus 620 such as universal serial bus (USB), printer port, game port, PCI bus, PCI Express or integrations of the various components described above into chipset components such as the northbridge or southbridge. For example, in various embodiments, the processing unit 604 may include an embedded memory controller (not shown) to enable more efficient transfer of data from the system memory 606 than the system bus 620 may provide.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

The invention claimed is:

1. A system for providing a computer security architecture, the system comprising:
   computing hardware, including at least one processor, a data store, and input/output facilities interfaced with the at least one processor, the data store containing an operating system and a plurality of subject entities executable by the at least one processor;
   the data store further containing a security subsystem executable by the at least one processor, that, when executed, causes the computing hardware to implement:
   a security server engine configured to apply selected rules, from among a set of rules defining one or more security policies, to a given set of security context parameters, to produce a security verdict representing whether a certain action requested by a subject entity is permissible, wherein each of the one or more security policies is associated with a corresponding communication interface, and wherein each of the one or more security policies is defined by at least a conjunction of a first predefined access mechanism and a second predefined access mechanism, and each of the first predefined access mechanism and the second predefined access mechanism are described in a configuration language accessible by the security server engine to implement the security policy without recompilation of the security server engine; and
   a plurality of gateway engines, each gateway engine being associated with at least one of the subject entities and dedicated to interfacing with the security server, each of the gateway engines being configured to: monitor requested actions by the associated at least subject entity and, for each requested action detected, identify a security context, determine an applicable security policy for the requested action based on a corresponding identified security context, and request a security verdict corresponding to the applicable security policy from the security server engine via a communication interface, wherein the request for the security verdict includes at least one security context parameter transmitted to the security server engine, the at least one security context parameter related to the requested actions, the security context, or the applicable security policy for the requested action, wherein the gateway engine is unable to produce a security verdict, and wherein the gateway engine is configured by
      a system-level configuration applicable to all subject entities on the system, and
      a reflection configuration unique to one of the subject entities; and
   a security enforcement engine configured to either permit or deny each of the requested actions according to the security verdict.

2. The system of claim 1, wherein each of the plurality of subject entities is associated with exactly one gateway engine.

3. The system of claim 1, wherein security context for each requested action includes at least one parameter selected from the group consisting of: a time of occurrence of the requested action, an identifier of a user initiating the requested action, a command called by the requested action, of any combination thereof.

4. The system of claim 1, wherein each communication interface of the security server engine is an application programming interface accessible only to the plurality of gateway engines.

5. The system of claim 1, wherein each requested action includes an application programming interface call.

6. The system of claim 1, wherein each requested action includes an interprocess communication.

7. The system of claim 1, wherein the plurality of subject entities includes at least one process as a subject entity.

8. The system of claim 1, wherein the plurality of subject entities includes at least one application program as a subject entity.

9. The system of claim 1, wherein the plurality of subject entities includes at least one computing device as a subject entity.

10. The system of claim 1, wherein the security server engine is implemented by execution of a microkernel.

11. The system of claim 1, wherein each of the gateway engines includes an evaluation engine that is independent of any of the security policies.

12. The system of claim 1, wherein each of the gateway engines includes a configuration that is specific to the corresponding subject entity and defines a plurality of action requests that the corresponding subject entity is able to take, along with corresponding policies implicated by those action requests.

13. The system of claim 1, wherein each of the gateway engines includes a security verdict cache configured to store previously-rendered security verdicts corresponding to that gateway engine.

14. The system of claim 1, wherein the one or more security policies includes parameters for a mandate access security model.

15. The system of claim 1, wherein the one or more security policies includes parameters for a Bell-LaPadula security model.

16. The system of claim 1, wherein each of the gateway engines is autonomously generated by the security subsystem.

17. A method for executing a computer security architecture on a computer system that includes at least one processor, a data store, and input/output facilities interfaced with the at least one processor, the data store containing an operating system and a plurality of subject entities executable by the at least one processor, the method being automatically executed by the computer system, and comprising:
  executing a security server, including:
    applying selected rules from among a set of rules defining one or more security policies to a given set of security context parameters, to produce security verdicts, each security verdict representing whether a certain action requested by a subject entity is permissible, wherein each of the one or more security policies is associated with a corresponding communication interface, and wherein each of the one or more security policies defined by at least a conjunction of a first predefined access mechanism and a second predefined access mechanism, and each of the first predefined access mechanism and the second predefined access mechanism are described in a configuration language accessible by the security server to implement the security policy without recompilation of the security server; and
  executing a plurality of gateway engines, each gateway engine being associated with at least one of the subject entities and dedicated to interfacing with the security server, and each of the gateway engines carrying out:
    monitoring of requested actions by the associated at least subject entity and, for each requested action detected, identifying a security context;
    determining an applicable security policy for the requested action based on a corresponding identified security context, and obtaining a security verdict from among the produced security verdicts corresponding to the applicable security policy via a communication interface, wherein the request for the security verdict includes at least one security context parameter transmitted to the security server engine, the at least one security context parameter related to the requested actions, the security context, or the applicable security policy for the requested action, wherein the gateway engine is unable to produce a security verdict, and wherein the gateway engine is configured by
      a system-level configuration applicable to all subject entities on the system, and
      a reflection configuration unique to one of the subject entities; and
  executing a security enforcement decision to either permit or deny each of the requested actions according to the security verdict.

18. The method of claim 17, wherein each of the plurality of subject entities is associated with exactly one gateway engine.

19. The method of claim 17, wherein the security context for each requested action includes at least one parameter selected from the group consisting of a time of occurrence of the requested action, an identifier of a user initiating the requested action, a command called by the requested action, or any combination thereof.

20. The method of claim 17, wherein executing each of the gateway engines includes executing an evaluation engine that is independent of any of the security policies.

21. The method of claim 17, wherein executing each of the gateway engines includes providing a configuration that is specific to the corresponding subject entity and defines a plurality of action requests that the corresponding subject entity is able to take, along with corresponding policies implicated by those action requests.

22. A system for executing a computer security architecture on a computer system that includes at least one processor, a data store, and input/output facilities interfaced with the at least one processor, the data store containing an operating system and a plurality of subject entities executable by the at least one processor, the system comprising:
  means for applying selected rules from among a set of rules defining one or more security policies to a given set of security context parameters, to produce security verdicts, each security verdict representing whether a certain action requested by a subject entity is permissible, wherein each of the one or more security policies is associated with a corresponding communication interface, and wherein each of the one or more security policies is defined by at least a conjunction of a first predefined access mechanism and a second predefined access mechanism, and each of the first predefined access mechanism and the second predefined access mechanism are describes in a configuration language accessible by the means for applying selected rules to implement the security policy without recompilation of the means for applying selected rules; and means for monitoring requested actions by at least subject entity and, for each requested action detected, identifying a security context;

means for determining an applicable security policy for the requested action based on a corresponding identified security context, and obtaining a security verdict from among the produced security verdicts corresponding to the applicable security policy via a communication interface, wherein the certain action request includes at least one security context parameter transmitted to the means for applying selected rules, the at least one security context parameter related to the requested action, the security context, or the applicable security policy for the requested action, wherein the means for monitoring requested actions is unable to produce a security verdict, and wherein the means for monitoring requested actions by at least subject entity is configured by a system-level configuration applicable to all subject entities on the system, and a reflection configuration unique to one of the subject entities; and means for either permitting or denying each of the requested actions according to the security verdict.

* * * * *

UNITED STATES PATENT AND TRADEMARK OFFICE
CERTIFICATE OF CORRECTION

PATENT NO. : 9,774,568 B2
APPLICATION NO. : 15/007790
DATED : September 26, 2017
INVENTOR(S) : Doukhvalov et al.

Page 1 of 1

It is certified that error appears in the above-identified patent and that said Letters Patent is hereby corrected as shown below:

In the Claims

Column 16, Lines 42-43, delete "at least".

Column 18, Lines 8-9, delete "at least".

Signed and Sealed this
Seventeenth Day of November, 2020

Andrei Iancu
*Director of the United States Patent and Trademark Office*